May 18, 1926.

F. G. SIMPSON 1,585,173

CONVERTER OF ELECTRIC CURRENTS

Filed Jan. 3, 1922

INVENTOR
Frederick Grant Simpson
BY
Fred C Matheny
ATTORNEY

May 18, 1926.

F. G. SIMPSON 1,585,173

CONVERTER OF ELECTRIC CURRENTS

Filed Jan. 3, 1922

INVENTOR
Frederick Grant Simpson
BY
Fred G. Matheny
ATTORNEY

May 18, 1926.

F. G. SIMPSON 1,585,173

CONVERTER OF ELECTRIC CURRENTS

Filed Jan. 3, 1922

INVENTOR
Frederick Grant Simpson
BY
Fred C Matheny
ATTORNEY

May 18, 1926.
F. G. SIMPSON
1,585,173
CONVERTER OF ELECTRIC CURRENTS
Filed Jan. 3, 1922    4 Sheets-Sheet 4
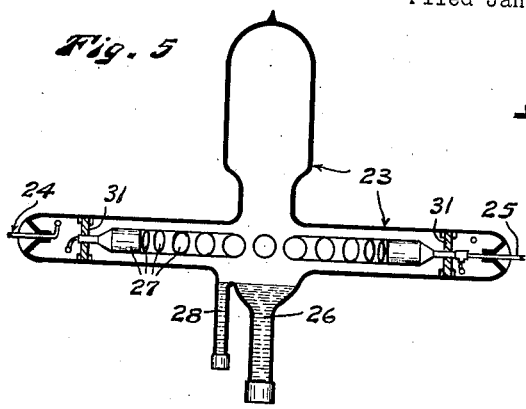
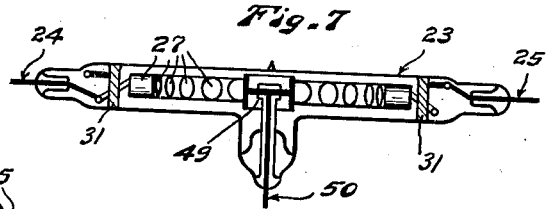
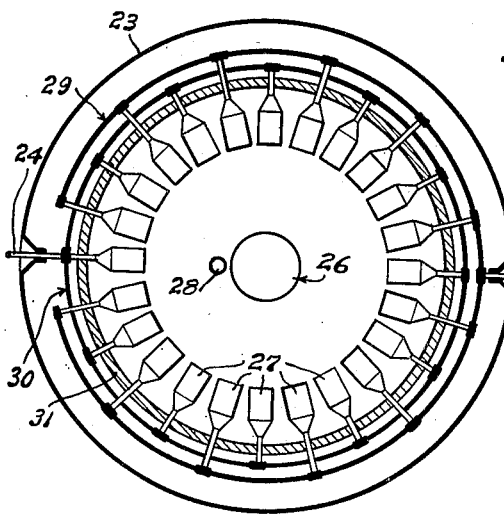
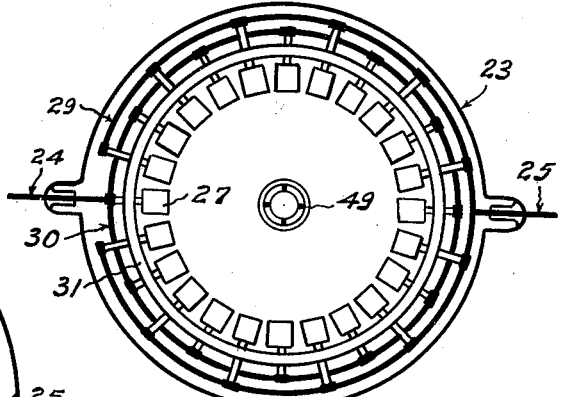
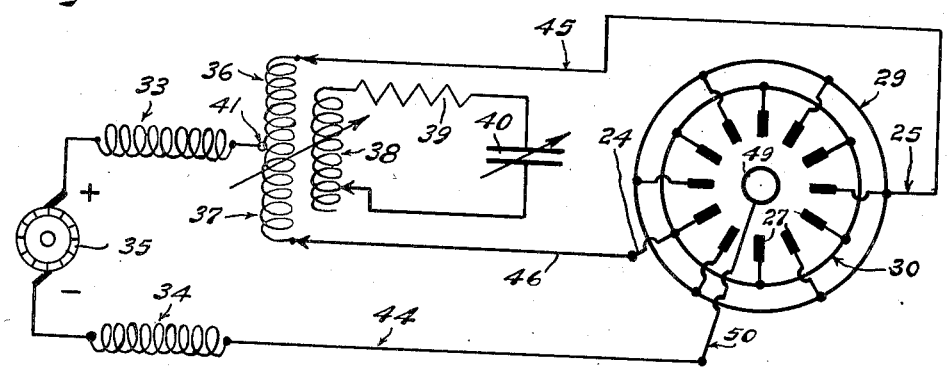
INVENTOR
Frederick Grant Simpson
BY
Fred C. Matheny
ATTORNEY Patented May 18, 1926.

1,585,173

UNITED STATES PATENT OFFICE.

FREDERICK GRANT SIMPSON, OF SEATTLE, WASHINGTON.

CONVERTER OF ELECTRIC CURRENTS.

Application filed January 3, 1922. Serial No. 526,649.

The present invention relates to apparatus for converting electric currents from one frequency to another and from direct to alternating.

The invention has, for its object, the provision of means for converting electric currents and particularly for the production of alternating currents of frequencies sufficiently high to be within the range of radio frequency currents as used at radio telegraph and radio telephone transmitting and receiving stations.

The invention consists substantially in the use, construction, arrangement and combinations of rotating gaseous conductors of electric currents, hereinafter more particularly explained and as illustrated in the accompanying drawings and finally pointed out in the appended claims.

By the term rotating gaseous conductor I mean an ionized gas in any form capable of conducting electric current between two electrodes and in which an ionized band is caused to be rotated or moved in a continuous path or cycle of movement preferably by subjecting the same to the action of a transverse magnetic field.

In the drawings, Figure 1 is a view in partial elevation and partial section of a device for the production of a rotating electric arc in a transverse magnetic field.

Figure 5 is a vertical section through the arc chamber of the device shown in Fig. 4 showing the arrangement of electrodes with respect to each other as well as the shape of the containing chamber.

Figure 6 is a horizontal section through said arc chamber showing the method of connecting each of the alternate anodes together to form two groups of anodes, each group consisting of alternate anodes in parallel.

Figure 7 shows in vertical section, a chamber containing electrodes arranged as shown in Figure 5, but in which the central electrode does not consist of mercury and in which the gas is made to conduct an electric current by methods of ionization other than those involved in an arc.

Figure 8 is a horizontal section of the chamber illustrated in Figure 7.

Figure 11 is a diagram illustrating the manner in which the apparatus shown in Figures 7 and 8 may be connected in circuit with other electrical devices to convert direct to alternating current, the magnet for producing the transverse magnetic field being omitted from the diagram.

Figure 12 shows certain condensers and a variable inductance coil introduced into the circuit in such a manner as to provide means for varying the frequency of the alternating current produced.

Figure 13:
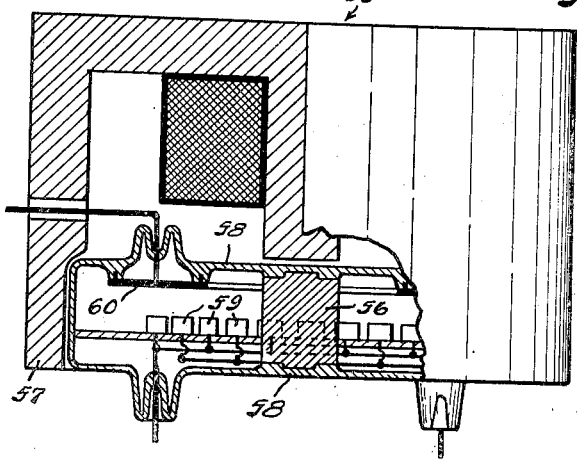

Figure 13 is a sectional view showing a magnet having one centrally arranged magnet pole and one circumferentially arranged magnet pole and showing two sets of electrodes of opposite polarity arranged between said magnet poles in such a manner that the direction of the magnetic field between the magnet poles will be at substantially right angles to the direction of flow of electric current between said electrodes.

In Figs. 1, 2, 3, and 9, I have shown a device for the production of a rotating electric arc in a transverse magnetic field which includes several electrodes of one polarity arranged radially about a single central electrode of opposite polarity; means for adjusting the distance between the central electrode and the several radially arranged electrodes; means for making the initial contact to start an arc, an electromagnet so placed with respect to the space between the electrodes as to produce a magnetic field at an angle of substantially ninety degrees to the direction of any arc which may be produced between any one of the several electrodes of one polarity and the central electrode of opposite polarity which they surround; a chamber containing all of the electrodes in common, surrounded in part by passages which communicate with each other through the interior of the central electrode for the purpose of circulating water or other cooling medium; a pipe communicating with the interior of the arc chamber from its exterior for the purpose of introducing a gas of any suitable kind and pressure to the interior of the arc chamber; and two other pipes communicating from the exterior to the interior of the passages provided for the circulation of a cooling medium.

Figure 1:
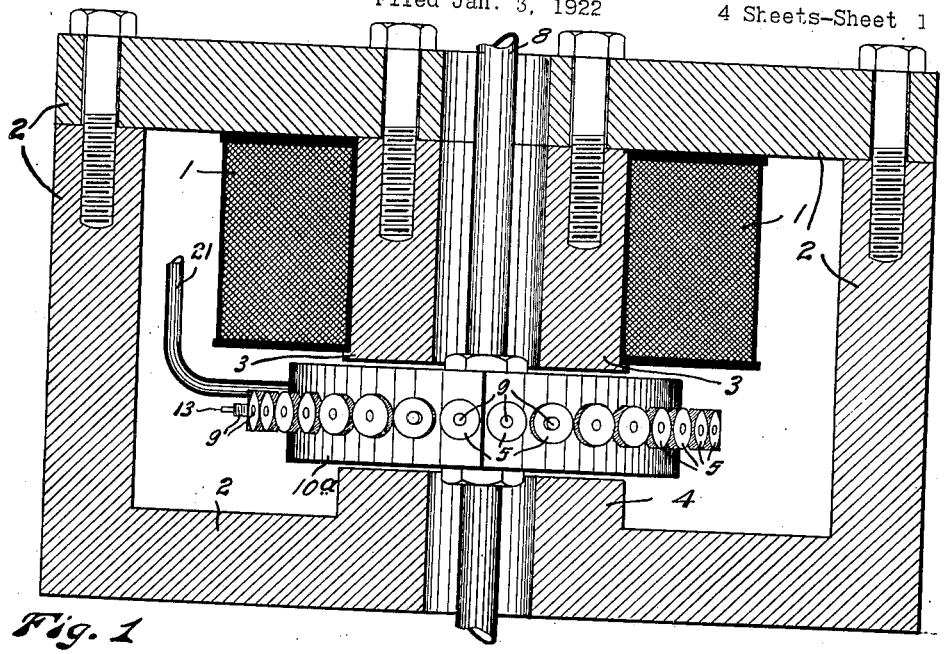

In Figure 1, 1 is the the coil of an electromagnet, having core and yoke 2 and poles 3 and 4. 5 are terminals for the connection of electrodes to an external electric circuit. 8 is a pipe for the conduction of water or other cooling medium to and from passages contained in the chamber 10. 8 also is a terminal for the connection of an electrode of opposite polarity to those having terminals 5, to an external electric circuit. 10 is a chamber which is internally subdivided into two compartments, one of which contains all of the electrodes and the other the cooling medium. 21 is a pipe leading to the compartment which contains the electrodes and is for the purpose of introducing a gas to that compartment. It is to be understood that my invention is not to be limited to the use of an electro-magnet as shown in the drawings. A permanent magnet of proper strength may be substituted for the electro-magnet shown. I prefer the use of an electro-magnet because of the ease which it affords of adjustment of the strength of magnetic field which it produces, by variation of the current in its exciting coils.

Figure 9:
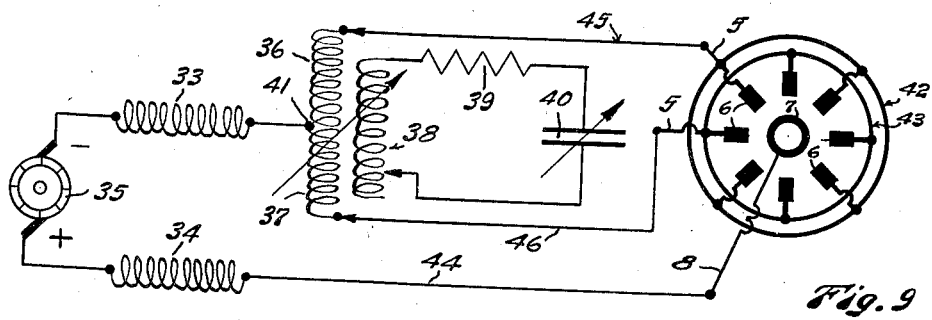
Figure 9 is a diagram illustrating the manner in which the arc apparatus shown in Figures 1, 2 and 3 may be connected in circuit with other electrical devices to produce alternating current when supplied with direct current; the electro-magnet, gas connection and cooling devices being omitted.
Figure 2:
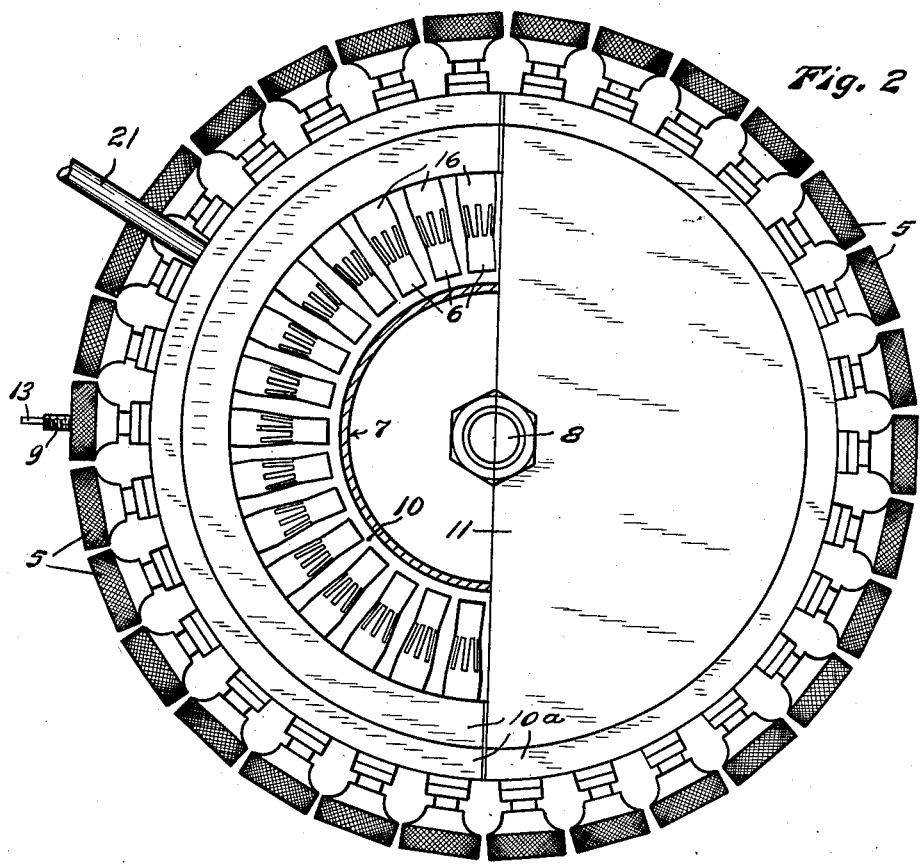
Figure 2 is a plan view of the arc chamber with a part of one of its sides removed to show the arrangement of the electrodes with respect to each other.
Figure 3:
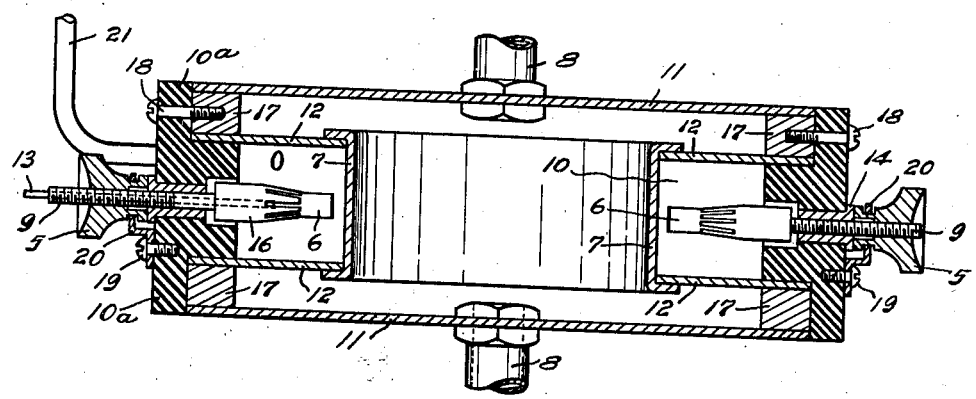
Figure 3 is a sectional view through the arc chamber showing the cooling means, the gas inlet means and the devices for making momentary contact between the central electrode and one of the surrounding electrodes to start the arc.

In Figures 2 and 3, which show the interior of chamber 10, 6 are electrodes, preferably of carbon, all of the same polarity with respect to the centrally placed electrode 7, preferably of copper, and are held in position by the holders 16. Electrodes 6 are in electrical and mechanical connection with the external terminal nuts 5 through the medium of holders 16 and threaded studs 9, the electrical connections being made as shown in Figure 9 so as to form two groups of electrodes 6, each group consisting of alternate electrodes. Electrode 7 is in electrical and mechanical connection with the pipes 8 through the medium of the rings 12 and 17 and the covering plates 11. 10ª is a ring of insulating material of any kind suitable to the temperatures to which it is subjected and the gas with which it is in contact. Ring 10ª is split on one of its diameters and is fastened in place by the screws 18 to the ring 17. Electrode 7, rings 12 and 17 and plates 11 are rigidly fastened together, usually by brazing the joints between them. Electrodes 6, which are disposed radially at equi-angular distances about the entire circumference of electrode 7, are held in position in the manner shown in Figure 3 where the bushings 14, through which are carried the studs 9 which are rigidly fastened to the electrode holders 16, are closely fitted in holes spaced at equi-angular distances about the entire circumference of the insulating ring 10ª. Electrodes 6 may be drawn in or out in a radial direction from the electrode 7, by turning the nuts 5 which are threaded on the studs 9. The nuts 5 are provided with annular peripheral grooves for the reception of the ends of brackets 20 which are fastened to the insulating ring 10ª by screws 19. Contact may be made between electrode 7 and one of the electrodes 6 by pressing on the pin 13 which is fastened to one only of the electrodes 6.

If the apparatus illustrated in Figures 1, 2 and 3 be supplied with either direct or alternating current by connecting its terminals 8 and 5, the latter all being connected in parallel to form one terminal, to a source of supply of such current of proper voltage and if a momentary contact be then made between electrode 7 and that one of electrodes 6, to which the pin 13 is attached, by pressing the pin in, radially, until the electrode 6, to which it is fastened, touches electrode 7, and then drawing the pin 13 back to its original position, an arc will form between the electrode 6 and electrode 7 at the place where the contact has been made. If now the electro-magnet poles 3 and 4 are excited by passing either a direct or alternating current through the coil 1, the arc will be moved in a direction perpendicular to the direction of the electric current passing through it and perpendicular to the direction of the magnetic field between the poles 3 and 4. The direction of movement of the arc in this instance will be along or around the annular space between the electrodes 6 and 7.

I have heretofore mentioned the use of alternating current for the excitation of both, or either, the arc and electro-magnet. While alternating current may be used for the purpose specified, I prefer to use direct current for both purposes, though in this respect my invention is not to be limited or restricted.

If direct current is used for both the excitation of the arc and electro-magnet, the arc will rotate in the annular space between the electrodes 6 and 7 around electrode 7 at an angular velocity depending upon the magnitudes of the current through the arc and of the magnetic field, the kind and pressure of the gas in the arc chamber and upon the length of the arc between the electrodes. If alternating current is used for the excitation of both, or either, the arc and electro-magnet, the direction of rotation around the annular space between the electrodes will depend upon the difference in phase between that of the current, in the arc, and that of the magnetic field. If both the current in the arc and the magnetic field are in synchronism and if they coincide in phase, the movement of the arc will be constant in direction but its angular velocity will vary depending upon the instantaneous values of the current in the arc and strength of magnetic field. If direct current is used for the excitation of the arc and alternating current for the excitation of the magnetic field, or conversely, the arc will oscillate in its direction of rotation about the electrode 7, its angular velocity varying as hereinabove stated.

For the purposes of this invention I regard it as advantageous that both the angular velocity and direction of movement of the arc shall be constant. For these reasons, as well as to avoid other well known difficulties in connection with the operation of alternating current arcs, I prefer to use direct current for both the arc and electro-magnet.

All that has heretofore been said, herein, concerning the use of direct or alternating currents in connection with an arc in a transverse magnetic field applies in general to all gaseous conductors of an electric current in such a field. The use of alternating currents through arcs, or other gaseous conductors, in which the electrical conductivity in one direction greatly preponderates over that in the opposite direction (as in the case of mercury vapor arc) involves greater difficulties than is the case in connection with the use of gaseous conductors in which the property of uni-directional conductivity is not so pronounced. The use of alternating current, however for the excitation of both, or either, magnetic field or gaseous conductor is, for the purpose of this invention, possible in connection with the operation of gaseous conductors in general in a transverse magnetic field, but I believe such use to be undesirable for the reasons hereinabove stated.

In the following I shall confine myself to the discussion of the use of direct currents only for the excitation of electro-magnets and through gaseous conductors in the field of such magnets, without excluding the use of alternating current for either purpose from the scope of this invention.

I have found it desirable to introduce hydrogen or a hydro-carbonic gas at a pressure of approximately seven hundred and sixty millimeters of mercury to the compartment which contains the electrodes in chamber 10 shown in Figures 1, 2 and 3 and to circulate cold water through the pipes 8 and cooling spaces partially surrounding this compartment and through the electrode 7. I have also found it to be advantageous to connect terminal 8, leading to electrode 7, to the positive side of the direct current circuit supplying current to the arc, thereby constituting electrode 7 an anode and electrodes 6 cathodes, when the latter are connected through their terminals 5 to the negative side of the same circuit.

In Figure 9, which is a diagrammatic representation of a manner of connecting the apparatus shown in Figures 1, 2 and 3, in a direct current circuit with other electrical devices, so as to produce alternating current in a circuit which is inductively coupled to the circuit which supplies direct current, the electro-magnet together with the gas and cooling devices have been omitted for greater simplicity. 35 is a direct current dynamo or other source of direct current supply, 33 and 34 are inductance coils, 36 and 37 constitute the primary of a transformer of which 38 is the secondary coil; coils 36 and 37 have each an equal number of turns and are of equal inductance. They are joined together at the point 41 and are inductively coupled together. 6 and 7 are the cathodes and anode respectively which are shown in Figures 2 and 3. The cathodes 6 are divided into groups, each group consisting of alternate cathodes taken around the entire ring of cathodes which surrounds the anode 7. The outer terminal of coil 36 is connected by the conductor 45 to one group of cathodes and the outer terminal of coil 37 is connected by the conductor 46 to the other group of cathodes. The negative terminal of the direct current generator 35 is connected to one terminal of the inductance coil 33, the opposite terminal of which is connected to the common inner terminal of the coils 36 and 37, which is to say, to the middle point of the combined coil 36 and 37. The positive terminal of the direct current generator 35 is connected to one terminal of the inductance coil 34, the opposite terminal of which is connected by conductor 44, to the arc anode 7 through its terminal 8. The variable secondary coil 38 is inductively coupled to the combined coil 36 and 37 in the manner shown in the diagram and is connected in series with the resistance 39 and the variable capacitance 40. In practice the secondary circuit may be the radiating or antenna circuit of a radio telegraph or telephone communication system.

If an electric current is made to flow, by making momentary contact between one of the cathodes 6 (belonging, say, to the group of cathodes to which the conductor 45 is connected) and the anode 7 and then withdrawing the cathode from its position of contact with the anode to its original position, an arc will be established between that particular cathode and the anode, the current so established flowing from the positive terminal of the generator 35 through the inductance 34, the conductor 44, the arc terminal 8, anode 7, the arc cathode 6, arc terminal 5, conductor 45, primary coil 36 to its inner terminal 41, inductance 33 to the negative terminal of the generator 35. Owing to the inductance in the circuit which carries this current it will not reach its maximum value immediately, and while it is increasing, due to the proper inductive association of coils 36, 37 and 38, there will be generated a counter electromotive force in the coil 37, which counter electromotive force will be impressed between those cathodes 6, which form the group which are connected to the coil 37 by the conductor 46, and the anode 7. During that interval of time when the current through the arc is at its maximum value there will be no variation of current in the coil 36 and therefore no generation of electromotive force in that coil or the coil 37, with which it is inductively associated. Considering now the magnetic field which is directed perpendicularly to the plane of the annular space between the cathodes 6 and the anode 7; the previously established arc will be deflected to that region of the annular space which lies opposite the next adjoining cathode.

The magnetic deflection and consequent lengthening, of the arc results in a decrease of current through the arc and coil 36. The decrease of current through the coil 36 creates an electromotive force opposing such decrease, which is communicated, through the inductive association between coils 36, 38 and coil 37, to the latter coil and therefrom to the cathodes 6 which form the group which are connected to coil 37 by the conductor 46. The electric intensity in the annular space between the electrodes is, therefore increased in the region to which the arc has been deflected, such increase being in the direction of the current through the arc. As a result the arc is simultaneously extinguished, between its electrodes, and re-established between the next succeeding cathode and the anode, in the direction of its deflection. As the next succeeding cathode is a member of the group of cathodes which is connected to the conductor 46, the current supplying the new arc will be through the coil 37.

The cycle of events which has been described will be repeated indefinitely and the current supplying the arc will flow through the coils 36 and 37 alternately, as the arc progresses in its rotation from cathode to next-adjoining cathode and therefore, from group of cathodes to group of cathodes. The direction of the current in the coils 36 and 37 is from their outside terminals to their middle or common terminal 41.

The succession of current impulses, each impulse of opposite direction with respect to the other regarding the combined coils 36 and 37 as a single primary coil, of which the coil 38 is the secondary coil, constitute, in effect an alternating current in the coil 36—37 which, by the well known principle of induction, produces an alternating electromotive force in the secondary coil 38.

If the secondary circuit, consisting of the coil 38, resistance 39 and capacitance 40, be made resonant to the frequency of the electromotive force generated in the coil 38, by adjusting the capacitance 40 or the inductance of the coil 38, or both, an alternating current of maximum amplitude will be attained within that circuit.

The angular velocity of the rotating arc, and therefore the frequency of the alternating current in the secondary circuit 38—39—40, may be varied either by changing the strength of the transverse magnetic field in which it rotates, or by changing the current which supplies the arc, or by changing the distance between the cathodes and the anode, or by changing the kind and pressure of the gas in the arc chamber, or in a limited degree by altering the constants of the supply circuit 35, 33, 36, 37, 45, 46, 34 and 44, or the constants of the secondary circuit 38, 39 and 40.

Within the range of frequencies established by a pre-selected supply current, electrode distance, kind and pressure of gas in the arc chamber, and constants of the supply circuit; I prefer to control the frequency of the alternating current in the secondary circuit by adjusting the strength of the transverse magnetic field, either by adjustment of the length of the air gap between the poles of the magnet or by adjustment of the current in the exciting coil of the magnet in the case of an electro-magnet. I then adjust either capacitance 40 or inductance of coil 38, or both, until an alternating current of maximum amplitude flows in the secondary circuit of which capacitance 40 and coil 38 are a part.

The inductive coupling of coils 36 and 37, while not essential, is conducive to greater stability of the rotating arc as it produces a component of the varying electric intensity which rotates in the direction in which the arc would rotate, due to the transverse magnetic field alone. The angular velocity of this component of the varying electric intensity is dependent upon the constants of the arc, of the supply circuit and, by its inductive association with the latter, of the secondary circuit. The angular velocity of the arc is therefore also a function of the forces incident to this rotating pulse of electric intensity as well as to those created by the transverse magnetic field.

In arranging the electrodes of arcs similar to those shown in Figures 1, 2 and 3 and hereinabove described in connection with Figure 9, I have found it to be advantageous to separate the cathodes from the anode, a distance of approximately one millimeter, thereby limiting the length of the arc by this minimum distance. The minimum distance between the cathodes may be varied within relatively wide limits dependent upon the values of current, electromotive force and frequency involved, but should not be less than one millimeter.

In Figures 4, 5, 6 and 10, I have shown a device embodying my invention in which I use a mercury vapor arc having several positive electrodes, or anodes, arranged radially about a mercury negative electrode or cathode, all of which are contained in a hermetically sealed chamber, usually of glass, one side of which is in part extended to provide sufficient cooling surface; an auxiliary anode situated in relatively close position to the cathode for the purpose of starting the arc between the cathode and any one or more of the several anodes which surround it; an electro-magnet so placed with respect to the space between the several anodes and the cathode as to produce a magnetic field at an angle of substantially ninety degrees to the direction of any arc which may be produced between any one of the several anodes and the cathode; and a longitudinal opening through the poles of the electro-magnet for the purpose of circulating air or other cooling medium about the arc chamber.

Figure 4:
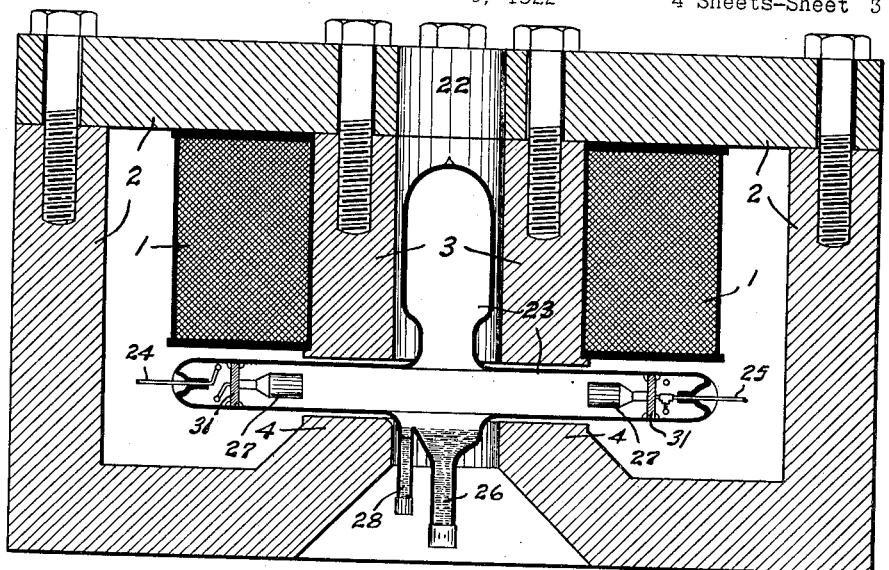
Figure 4 is a sectional view of a device embodying my invention in which I use a mercury vapor arc having several positive electrodes, or anodes, arranged radially about a mercury negative electrode or cathode.
Figure 10:
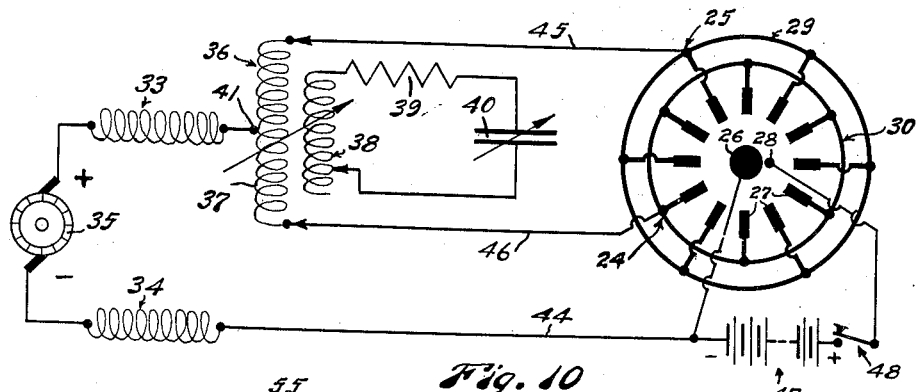
Figure 10 is a diagram illustrating the manner in which the apparatus shown in Figures 4, 5 and 6 may be connected in circuit with other electrical devices to produce alternating current when supplied with direct current, the magnets for producing the transverse magnetic field being omitted.

In Figure 10, which is a diagrammatic representation of a manner of connecting the apparatus shown in Figures 4, 5 and 6, in a direct current circuit with other electrical devices, so as to produce alternating current in a circuit which is inductively coupled to the circuit which supplies direct current, the electromagnet has been omitted for greater simplicity. All of the parts bearing the same numbers as those shown in Figure 9 are similar to those described in connection therewith. Referring to Figures 4, 5, 6 and 10, 1 is the coil of an electro-magnet, having core and yoke 2 and poles 3 and 4. 22 is a longitudinal passage through the poles 3 and 4. 24 and 25 are terminals for the connection of the anodes of a mercury vapor arc to an external electric circuit. 26 is the mercury cathode, with its terminal, of a mercury vapor arc. 28 is an auxiliary anode, with its terminal, for starting the arc in a well known manner of starting such arcs. 23 is the arc chamber. 27 are anodes, usually of graphite. One group, consisting of each alternate anode, is formed by connecting such anodes together by the conductor 29. Another group, consisting of the remaining anodes (omitting the auxiliary starting anode 28) is formed by connecting them together by the conductor 30. 31 is a support of non-conducting, heat-resisting material, which holds the anodes at an equi-angular distance from each other and at equal radial distances from the cathode. I prefer to cover the conductors 29 and 30 with heat-resisting insulating material, as a safe-guard against the establishment of an arc between either of these conductors and the cathode. 47 is a source of electric current which may be connected in circuit with the auxiliary anode 28 and the cathode 26 by momentarily closing the switch 48, for the purpose of starting an arc between one of the anodes 27 and the cathode 26. The distance between the anodes 27 and the cathode 26 may be varied within relatively wide limits dependent upon the electromotive-force produced at the source 35. I have found it desirable to use mercury vapor arcs in which the anodes 27 and the cathode 26 were separated by distances ranging from two centi-meters to twenty centi-meters, and in which the distance between the anodes 27 varies from one millimeter to two centimeters. For the purpose of this invention the distances between the anodes and the cathode may be varied within indefinite limits in so far as such distances are consistent with well known principles of construction applying to mercury vapor arcs. The distance between the anodes 27 may also be varied within relatively wide limits dependent upon the values of current, electromotive-force and frequency involved, but should not be less than one millimeter.

The pressure of the mercury vapor within the arc chamber 23 varies with its temperature which I prefer to so regulate as to keep the arc always in the form of a "band."

I have found it to be possible to admit other gases to the arc chamber, with the mercury vapor, without serious disturbance in the operating characteristics of the arc.

In Figure 10 the electro-magnet having coil 1, core and yoke 2 and poles 3, has been omitted for greater simplicity. It is to be assumed, however, that the arc chamber 23 is placed in a magnetic field in a manner similar to that shown in Figure 4. The direct current dynamo 35, inductance coils 33 and 34, primary coils 36 and 37 with their common terminal 41, conductors 44, 45 and 46, resistance 39 and capacitance 40 are all exactly as shown in Figure 9 and described in connection therewith, except that I have shown the polarity of dynamo 35 reversed. Conductor 45 is connected to anode terminal 25 and conductor 46 is connected to anode terminal 24. Conductor 44 is connected to cathode terminal 26.

If an arc be started between any one of the anodes 27 and the cathode 26 by momentarily closing the switch 48, there will ensue a sequence of events which may be described in identical terms to those which I have used in connection with Figure 9 and an alternating current will be created in the secondary circuit 38—39—40.

In Figs. 7, 8, and 11 I have shown an arrangement similar to that shown in Figs. 4, 5, 6, and 10 except that the mercury electrode is replaced by an electrode of different form, the auxiliary starting anode and the extension of the surface of the arc chamber for cooling purpose necessarily being omitted. It is understood that the arc chamber shown in Figs. 7 and 8 may be placed in the field of an electro-magnet in a manner similar to that shown as applying to a mercury vapor arc in Figure 4; the magnetic field having a direction substantially ninety degrees to the direction of any current of electricity which may be caused to flow between any of the several electrodes of one polarity and the central electrode which is of opposite polarity.

In Figures 7, 8 and 11, 23 is a heremetically sealed chamber, usually having walls of glass, which contains electrodes 27, all of one polarity with respect to electrode 49, which is of opposite polarity, and a gas which may be one of a great number of gases, or a mixture of such gases. The electrodes 27 are supported at equi-angular distances from each other and at equal distances from the electrode 49, by the insulating and heat resisting ring 31. Electrodes 27 are divided into two groups; one group consisting of alternate electrodes connected together by conductor 29, the other group being connected together by the conductor 30. These groups are brought out to their respective terminals 24 and 25. Electrode 49 is brought out to terminal 50.

In Figure 11, the direct current dynamo 35, inductance coils 33 and 34, primary coils 36 and 37 with their common terminal 41, secondary coil 38, conductors 44, 45 and 46, resistance 39 and capacitance 40 are all exactly as shown in Figure 10 and described in connection therewith. Conductor 45 is connected to the terminal 25 and conductor 46 to terminal 24, thereby in this instance constituting electrodes 27, anodes. Conductor 44 is connected to terminal 50 making electrode 49 a cathode. In Figure 11 it is assumed that the chamber 23 is placed in a magnetic field in a manner similar to that shown in Figure 4.

It is a well established fact that rotation of a gaseous conductor of an electric current in a transverse magnetic field is, at least, greatly facilitated, "if the bulk of the discharge follows a certain path. This path joins the point of maximum density in the anode to the cathode, and is apparently the least path from the cathode to this point. Moreover, this is the case when the pressure is between certain limits" (depending on the electromotive-force applied to the electrodes between which the gaseous conductor is caused to rotate). This condition of a gaseous conductor of an electric current, has been designated as the "band" stage. The gaseous conductor in this stage "behaves like a flexible wire carrying current of sufficient intensity to produce rotation in a magnetic field of suitable intensity." It is necessary to independently determine the "band" stage for different gases and for different distances between the electrodes of opposite polarity.

In practice I prefer to separate the anodes 27, from the cathode 49 by a distance of approximately four centimeters and to use pure hydrogen at a pressure of approximately ten millimeters of mercury. It is to be understood, however, that any one of a great number of gases may be used and that the range of suitable pressures varies between wide limits. It is to be also understood that the various gases may be mixed. Reference is made to the discussion of this subject by H. A. Wilson and G. H. Martyn as published in the Proceedings of the Royal Society (England) volume 79 of 1907, pages 417 to 427; to the papers published in the Philosophical Magazine by D. N. Mallik (6) volume 16, 1908, pages 531 to 550; and (6) volume 24, 1912, pages 500 to 507; and to the paper published in the Philosophical Magazine (6) volume 32, 1916, pages 50 to 65 by D. N. Mallik and A. B. Das. Also on the Poulsen Arc and its Theory, by P. O. Pedersen—Proceedings of the Institute of Radio Engineers, 1917, volume 5, pages 255 to 316.

The anodes 27, shown in Figures 7, 8 and 11 may be separated from each other within a relatively wide range of distances dependent upon the value of current, electromotive-force, frequency, kind of gas and gas pressure involved, but this distance should not be less than one millimeter.

The conductors 29 and 30 should be covered with a heat resisting insulating material in such a manner as to prevent any electric discharge between either of these conductors and any other conductor.

If a difference of electric potential is established between the anodes 27 and the cathode 49 by connecting the anodes and the cathode in a circuit with the dynamo 35, which may, for example, be capable of producing such difference of potential of, say two thousand volts, the gas between the anodes and the cathode will become ionized, under the stress of the electric field imposed upon it, provided that the pressure of the gas be not too great or too small, and a current will flow through the gas in the space between the anodes and the cathode. If the distance between the anodes and the cathode has been properly adjusted for the difference of electrical potential between them and for the kind and pressure of gas within the chamber 23, this current will follow a certain path which joins the point of maximum electric density in the anodes 27 to the cathode 49. The ionized gaseous conductor will, under the conditions described, have the form of a band extending from a point on the anodes 27 and meeting an ionized region, which covers a somewhat greater electrode area than does the band, at the cathode 49. This gaseous conductor of an electric current if placed in a transverse magnetic field, in the manner described, will rotate about the cathode 49 and will successively make contact with each of the anodes 27, thereby producing an alternating current in the secondary circuit 38—39—40, in substantially the same manner as that previously described in connection with Figures 9 and 10. The frequency of the alternating current created may be varied in any of the ways described in connection with Figures 9 and 10.

Figure 12:
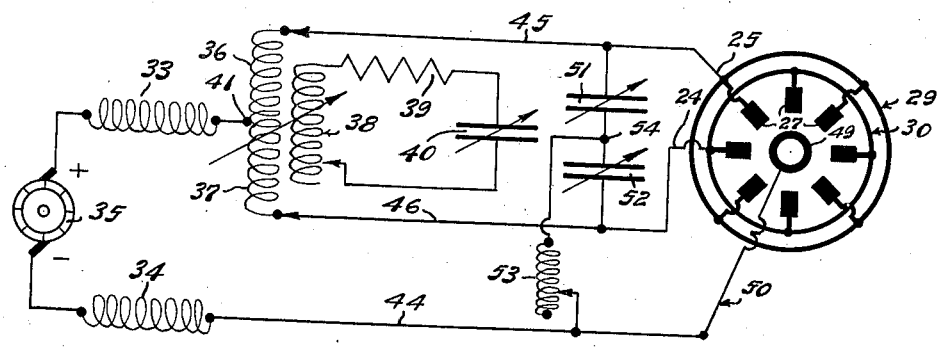
Figure 12 is a diagram similar to Figure 11, except that, in addition to the apparatus shown in Figure 11.

Figure 12 is the same as Figure 11 with the exception of the addition of the variable condensers 51 and 52 which are connected in series with their outside terminals connected to the conductors 45 and 46 respectively and their common terminal 54 connected to the variable inductance coil 53, the other terminal of which is connected to the conductor 44.

The function of variable condensers 51 and 52 with the variable inductance coil 53 is to provide means of adjustment of the period of oscillation of the circuit 51, 45, 25, 27, the gas, 49, 50, 44 and 53, and the circuit 52, 46, 24, 27, the gas, 49, 50, 44 and 53, by adjustment of the variable inductance 53, or the variable condensers 51 and 52 or both. The period of oscillation of these two circuits should always be the same. The angular velocity of the rotating electric field between the electrodes 27 and 49 is a function of this oscillatory period and therefore the adjustment of the variable inductance 53, or the variable condensers 51 and 52, is also a contributing means of adjustment of the frequency of the alternating current created in the secondary circuit 38—39—40.

In Figure 13 I have shown an electromagnet 55 having a centrally arranged pole 56 and a circumferentially arranged pole 57 and having between such poles 56 and 57, a housing 58, within which are disposed a plurality of electrodes 59, of one polarity and one or more electrodes 60, of opposite polarity. The electrodes 59 and 60 are arranged so that the direction of flow of current therebetween will be at substantially right angles to the magnetic field, and any arc or other gaseous conductor between said electrodes will be caused to rotate and thereby produce pulsations in the current in a circuit in substantially the same manner as hereinbefore described.

In using the term "gaseous conductor of an electric current" I do not differentiate between the various known methods of ionizing the gas which forms such conductor, neither is my invention to be limited or restricted to any particular methods of ionizing the gas.

While I have shown and described certain forms of apparatus for producing rotating gaseous conductors in transverse magnetic fields, my invention is not to be limited to the particular forms illustrated, or to the arrangements of circuits shown in connection therewith as it will be apparent that many modifications in the shape and arrangement of the various parts may be made without departing from the scope of the appended claims. As an instance the arrangement of electrodes with respect to the direction of the magnetic field may be reversed, as shown in Figure 13, that is, the magnetic field may be directed in a radial direction and the current through the gaseous conductor in an axial direction, without departing from the scope of my invention. It will also be apparent that it may be utilized for other purposes than those shown and described.

Having described my invention what I claim is:—

1. A device for producing periodic pulsations of variable frequency in a current in a circuit, embodying an electrode of one polarity, a plurality of electrodes of opposite polarity arranged in spaced apart continuous relation around said first named electrode means for producing an electric arc between said first named electrode and said last named electrodes, means for producing a magnetic field at substantially right angles to said electric arc to move said electric arc successively from one to another of said last named electrodes and means for adjusting the distance between said electrodes to thereby vary the frequency of said periodic pulsations.

2. In a converter of electrical current, a gas tight housing, an electrode of one polarity in the center of said housing, electrodes of opposite polarity in said housing and arranged in a continuous path around said first named electrode, means for adjusting each of said last named electrodes to vary their distance from said first named electrode, and terminal means on the exterior of said housing for all of said electrodes.

3. In a converter of electric current, a gas tight housing, an electrode of one polarity in the center of said housing, a plurality of electrodes of opposite polarity arranged radially around said first named electrode in spaced relation therefrom, means for producing a magnetic field at substantially right angles to said electrodes, terminal means on the exterior of said housing for all of said electrodes and means for momentarily making contact between one of said radially arranged electrodes and said central electrode.

4. In a converter of the class described, a housing having a gas tight compartment forming an arcing chamber, an electrode of one polarity in the center of said housing, a plurality of electrodes of opposite polarity arranged around said first named electrode, means forming cooling jacket spaces within said housing around said arcing chamber and through said central electrode and conduits for maintaining a continuous circulation of cooling medium in said cooling jacket spaces.

Seattle, Wn., Dec. 27, 1921.

FREDERICK GRANT SIMPSON.